US009788490B2

(12) United States Patent
Jordan et al.

(10) Patent No.: US 9,788,490 B2
(45) Date of Patent: Oct. 17, 2017

(54) SWATHER RAKE ATTACHMENT ASSEMBLY AND HAY HANDLING SYSTEM

(71) Applicants: Ben Jordan, Cedar City, UT (US); Nathaniel LeBaron, Cedar City, UT (US)

(72) Inventors: Ben Jordan, Cedar City, UT (US); Nathaniel LeBaron, Cedar City, UT (US)

(73) Assignee: Lejordan Corporation, Cedar City, UT (US)

( * ) Notice: Subject to any disclaimer, the term of this patent is extended or adjusted under 35 U.S.C. 154(b) by 96 days.

(21) Appl. No.: 15/049,073

(22) Filed: Feb. 20, 2016

(65) Prior Publication Data
US 2016/0242359 A1 Aug. 25, 2016

Related U.S. Application Data

(60) Provisional application No. 62/118,590, filed on Feb. 20, 2015.

(51) Int. Cl.
*A01D 7/04* (2006.01)
*A01D 78/14* (2006.01)
*A01D 78/10* (2006.01)

(52) U.S. Cl.
CPC ....... *A01D 78/146* (2013.01); *A01D 78/1014* (2013.01)

(58) Field of Classification Search
CPC .... A01D 78/006; A01D 78/007; A01D 78/02; A01D 78/1028; A01D 78/1035; A01D 78/146

USPC .......................................... 56/193, 365, 377
See application file for complete search history.

(56) References Cited

U.S. PATENT DOCUMENTS

| | | | | |
|---|---|---|---|---|
| 3,035,392 A * | 5/1962 | Der Lely Cornelis Van | ...... | A01D 78/142 56/377 |
| 3,167,900 A * | 2/1965 | Wood | ...... | A01D 78/148 56/377 |
| 3,706,191 A * | 12/1972 | Barbot | ...... | A01D 78/148 56/377 |
| 4,723,403 A * | 2/1988 | Webster | ...... | A01D 78/146 56/181 |
| 4,753,063 A * | 6/1988 | Buck | ...... | A01D 78/144 56/370 |
| 5,404,702 A * | 4/1995 | Lewis | ...... | A01D 57/12 56/341 |
| 5,752,375 A * | 5/1998 | Tonutti | ...... | A01D 78/146 56/365 |
| 5,987,864 A * | 11/1999 | Lutz | ...... | A01D 78/146 56/377 |

(Continued)

FOREIGN PATENT DOCUMENTS

DE EP 2520147 A2 * 11/2012 ............ A01B 73/04

*Primary Examiner* — John G Weiss
(74) *Attorney, Agent, or Firm* — M. Reid Russell

(57) ABSTRACT

A swather rake attachment assembly that quick connects to a front of a swather and includes two rake arms that each include lateral holding arm pivot connections to a base frame where the lateral arms are each pivotally coupled to arched reinforcement members by a torsion assembly that is coupled to a parabolic curved tool bar that includes the parabolic curved tool bar and arched reinforcement members, and includes a Z-bar coupling of the two rake arms together that control the height of the arm rake assemblies.

7 Claims, 9 Drawing Sheets

(56) References Cited

U.S. PATENT DOCUMENTS

| | | | |
|---|---|---|---|
| 8,001,755 B2* | 8/2011 | Menichetti et al. | A01D 78/144 56/228 |
| 2014/0090347 A1* | 4/2014 | Peden | A01F 15/10 56/341 |
| 2014/0237972 A1* | 8/2014 | Collins | A01D 78/142 56/16.7 |
| 2015/0237801 A1* | 8/2015 | Giovannini | A01D 78/14 56/381 |

* cited by examiner

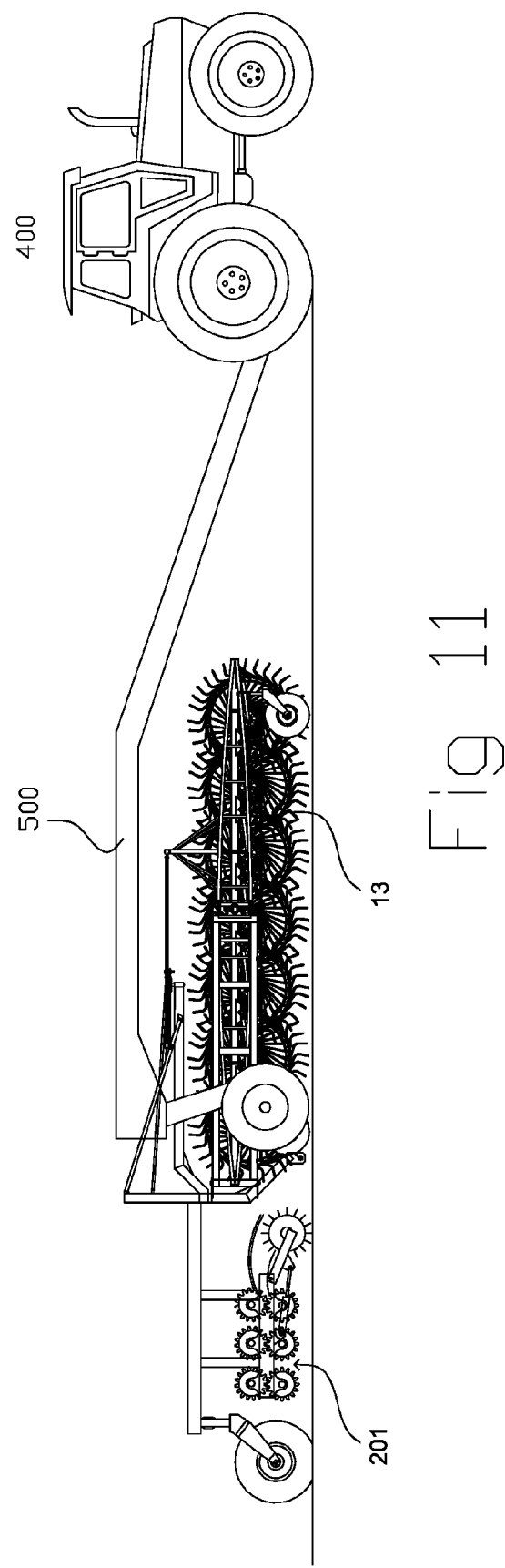

SWATHER RAKE ATTACHMENT ASSEMBLY AND HAY HANDLING SYSTEM

CROSS-REFERENCE TO RELATED APPLICATIONS

This application claims the benefit of U.S. Provisional Application Ser. No. 62/118,590, filed on Feb. 20, 2015, which is incorporated herein by reference.

TECHNICAL FIELD

The present disclosure relates to agricultural systems. More particularly, the present disclosure is directed to systems and methods for raking agricultural products, such as hay, into one or more windrows.

BACKGROUND

In modern day hay production, especially with alfalfa, hay is cut/swathed and then left to dry for a duration of time. Then, two rows are raked into one and left for another duration of time for final drying, after which it is then baled. With the way hay is currently being raked, there are multiple problems for both the hay as well as the driver. The rakes are being pulled behind a tractor, which requires the driver to twist the body, looking over the shoulder repeatedly. Not only does hay get missed when the driver looks forward, but the constant twisting can cause back and neck strain. This method also creates higher operator fatigue and compromises his ability to fully monitor forward and rearward operations at the same time. As a result, the tractor often runs over the hay causing leaf loss and damage to the windrows. A user is also limited to a single raking pass during the drying phase.

Another problem is that the rear raking system has difficulty accessing the corner parts of the field as well as maneuvering tight turns. This raking process is relatively slow and limited by design.

On larger farm operations, the process of hay raking and secondary hay conditioning/processing typically requires the use of tractor, which is usually in high demand for other farming functions and increases the hours and wear and tear on the tractor. Most commonly, raking and conditioning/processing are done separately, which requires multiple passes, which in turn leads to creating more field compaction, crop damage, man hours, fuel cost as well as extensive equipment costs.

Others have attempted to improve the raking process by making a forward rake attached to a tractor, such as in U.S. Pat. No. 8,495,856 to Collins. However, this does not solve the problems of being limited to a single raking pass during the drying phase, running over hay/windrows during maneuvering, moving at slow speeds, not being able to make tight turns, and the over-use of tractors. Due to the configuration of typical farm tractors, additional problems with tractor-attached forward-rakes remain, such as limited visibility, lack of windrow clearance, and windrow width. If the forward-rake connected to the tractor is used in conjunction with hay conditioning/processing devices attached to the rear of the tractor, we again see the problem of the operator compromising his ability to fully monitor forward and rearward operations at the same time and giving rise to the same problems mentioned earlier herein. Therefore, there remains a need for a forward hay-handling system attachable to harvesting equipment, such as a tractor or swather (also known as a windrower; e.g., self-propelled, forward cab, high clearance, harvesting machine with a wide wheel base greater than typical tractors).

Swathers are specialized machines designed primarily for hay cutting, which means they sit unused most of the time. Having attachments to a swather would allow tractor-hours to be reduced and would make greater use of a swather. The swather hay handling system disclosed herein allows superior visibility of the entire operation without requiring the operator to continually look rearward (twisting body, straining neck and back). It also allows for larger and wider windrow/hay rows (due to the clearance beneath the swather), faster speeds, a large adjustability for single or multiple windrows for multi-stage raking, and has the options to utilize conditioning/processing equipment at the same time as raking for the purpose of faster drying and higher quality of hay without adding operator fatigue (lessening the need to monitor rearward).

Because a swather can turn on the front wheels with zero forward speed, this allows for superior maneuverability on a field and significantly reduces running over and causing damage to hay. A swather has the ability to lift the rake attachment up and over hay when turning as well. The swather's speed control and float control creates a smoother and higher speed function creating less fatigue/abuse on equipment and higher productivity.

On a smaller farm operation, the farm operator usually has a tractor only (no self propelled harvester) where the cutting is done by a pull-type swather (lower cost harvesting mechanism) attached behind the tractor and the hay is raked by a pulled hay rake. If the hay is further processed for faster drying, an additional tool is required, thus totaling three implements and three passes across the field. This ends up creating a lot of rearward looking and twisting as well. Therefore, there remains a need for a pull-type harvester that can also be utilized with a raking attachment and/or hay processor apparatus combined, attachable/detachable mechanism to facilitate hay production with fewer implements, fewer field passes, and less rearward-looking fatigue, to achieve the same results. Solving these problems, as well as others, will also lead to lowering the total operation costs.

The present invention provides superior hay raking, conditioning/processing systems for farm operations, and is more user friendly for the operator. It improves the quality of the hay by reducing the amount of time it is exposed to the sun, requiring less drying time on field, and can increase hay nutritional levels. The option for farmers to utilize the hay harvesting machine for raking and hay processing by the means of having changeable attachments or combined attachments provides the opportunity of lowering overhead costs of equipment as well as reducing the amount of hours/passes on field and use of equipment to produce sellable crop.

SUMMARY OF EXAMPLE EMBODIMENTS

In one embodiment, a system for agricultural raking comprises a rake assembly removably attachable to the front end of a swather, wherein the rake assembly comprises two arm assemblies having a plurality of rake wheels coupled thereto.

In one embodiment, the rake assembly comprises a base frame removably attachable to the swather by one or more connecting points, the base frame having two rake arm assemblies extending horizontally therefrom, each rake arm assembly comprising a lateral holding arm connected to the base frame using a primary pivot connector, the lateral arms being pivotally coupled to two arched reinforcement members via a pivoting torsion assembly, the pivoting torsion assembly being further coupled to a parabolic curved tool bar; a plurality of bracing members interposed between the parabolic curved tool bar and the two arched reinforcement members; a plurality of rake wheels pivotally coupled to the parabolic curved tool bar; and a Z-bar coupling the two rake arm assemblies together and configured to control the height of the arm rake assemblies.

In one embodiment, the rake assembly comprises two rake arm assemblies individually attachable to the front of a swather, each rake arm assembly having two hydraulically driven pivot points. This allows an operator to adjust the rake assembly to a variety of positions, which provides the option for 1) raking material on the ground from two rows into one for subsequent conditioning/processing for faster drying; 2) to rake two rows into one and leave for baling; or 3) to rake two rows into two closer rows which can be raked again (with optional conditioning/processing simultaneously) into one row for faster drying time in preparation for baling hay as well as many other options.

In one embodiment, a system of simultaneous agricultural raking and processing comprises a rake assembly removably attachable to harvesting equipment, wherein the rake assembly comprises two arm assemblies having a plurality of rake wheels coupled thereto; and an agricultural processor configured behind the rake assembly.

BRIEF DESCRIPTION OF THE DRAWINGS

FIG. 11 is a side view of a pull-type swather with a rake assembly combined with a conditioner/processor apparatus attachment following the pull-type rake.

DETAILED DESCRIPTION OF EXAMPLE EMBODIMENTS

Figure 1:
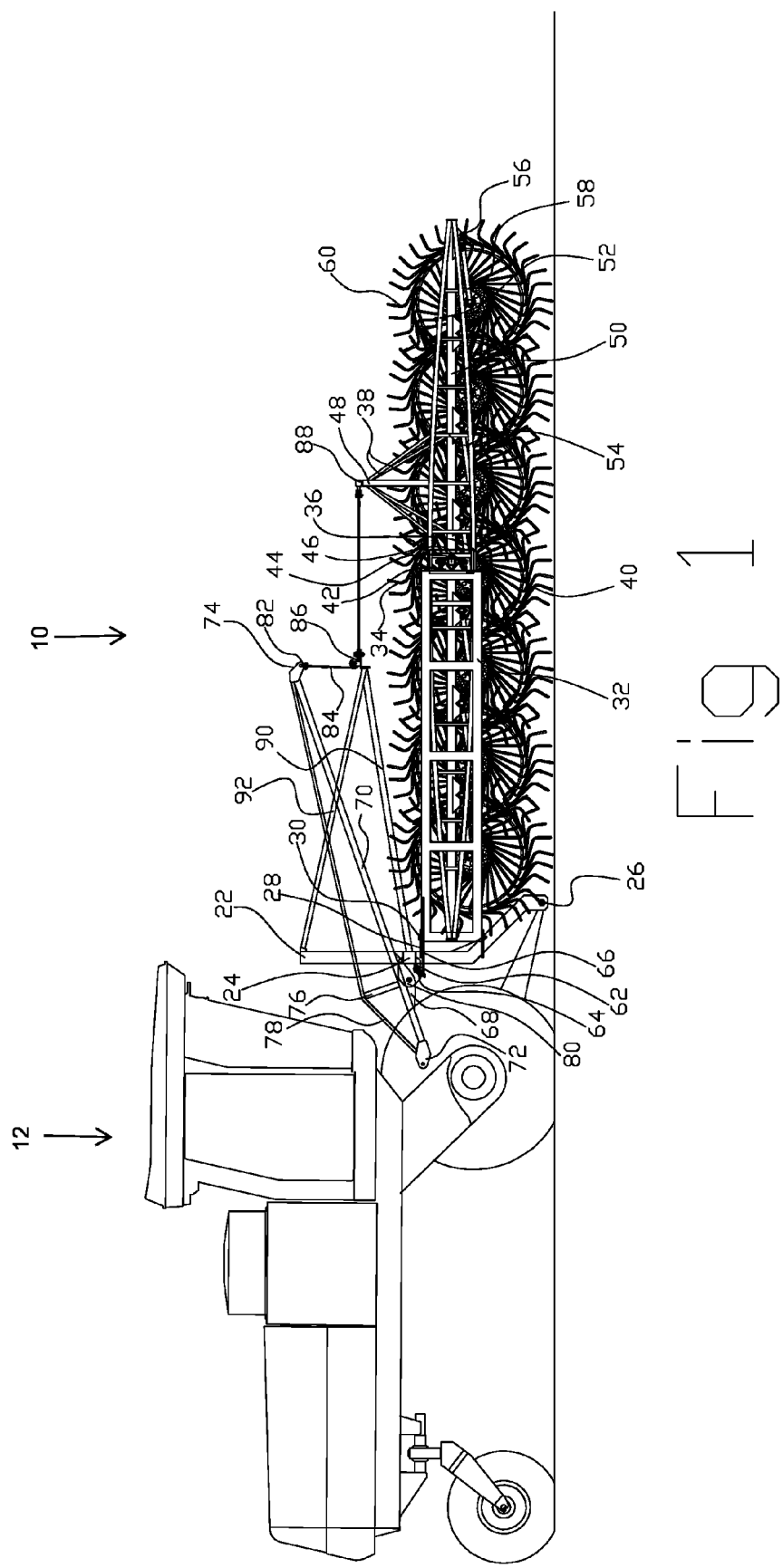
FIG. 1 is a side view of a self-propelled swather with an adjustable forward-rake assembly attached by a three-point hitch Z-bar with cables.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiment," and the like, may indicate that the embodiment(s) so described may include a particular feature, structure, or characteristic, but not every embodiment necessarily includes the particular features, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may. Further, not all drawings may be drawn to scale.

Accordingly, the particular arrangements disclosed are meant to be illustrative only and not limiting as to the scope of the invention, which is to be given the full breadth of the appended claims and nay and all equivalents thereof. Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed process or methods generally may be carried out in various different sequences and arrangements while still falling within the scope of the present invention.

The term "coupled" may mean that two or more elements are in direct physical or electrical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

Figure 2:
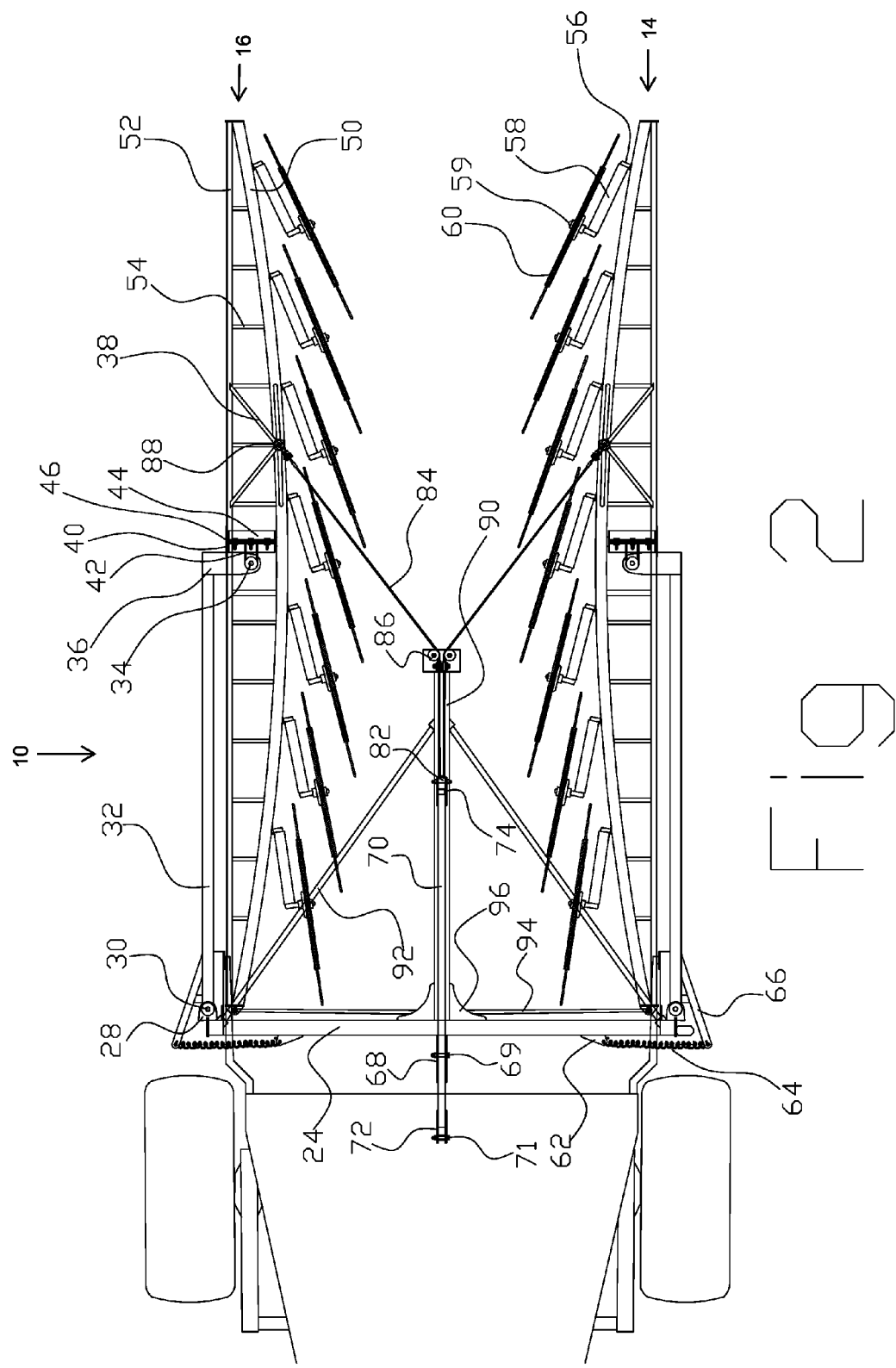
FIG. 2 is a top view of a self-propelled swather with an adjustable forward-rake assembly attached by three-point hitch Z-bar with cables.

In one embodiment, as shown in FIGS. 1-2, a rake assembly 10 is removably attachable to the front of swather 12 by the means of a three-point hitch or equivalent (e.g., connecting points 26 which are attached to base frame members 22 and to the swather's upper connecting point via lower adjoining plates 72 at the lower end of a Z-bar 70). As used herein, a Z-bar refers to a rod, beam, plate, or coupled plates having a pivoting connection at each end. In other words, the Z-bar itself is not a "Z" in shape, but when combined with 2 other rods on each pivoting end, typically forms a "Z"-type configuration when either tension is applied or released, depending upon the system. Although not fully shown, it will be understood to those in the art that A base frame comprises main frame horizontal member 24, with vertical members 22. Attached to each side of the base frame going forward are two lateral holding arms 32 that are connected to the main frame horizontal member 24 by the means of the primary pivot connector 30 and the primary pivot holding brackets 28. At the opposite end of the holding arms 32 from the base frame is the secondary pivoting mechanisms 34 which are held to holding arms 32 by connecting plates 36. Attached to the secondary pivoting mechanism 34 (which is vertical) by way of connecting plates 42 is the horizontal pivoting torsion assembly (comprised of members 44, 46) (e.g., torsion axle-type assembly utilized in the trailer industry for suspension). The inner torsion member 46 is connected on one end to connecting plate 40. The connecting plate 40 is attached to both upper and lower arched reinforcement members 52. The other end of inner torsion member 46 is connected or otherwise coupled to a parabolic curved tool bar member 50. The torsion pivot assembly 44, 46 allows for the entire rake assembly 10 to do a rocking-type movement allowing the front or the rear of the rake assembly 10 to follow the elevation contour of the soil as it travels. Also, when the rake assembly 10 is raised in the air for transport, the pivoting torsion assembly 44, 46 encourages the raking frame (comprised of arched reinforcement members 52 and parabolic curved tool bar members 50) to remain level for transportation, preventing either end from freely coming into contact with ground surface. The two parabolic curved tool bars 50 are coupled to one another on the end proximal to the swather using an adjustable rod 94. Adjustable rod 94 helps control the angle and distance between each raking frame. It will be noted that the parabolic curved tool bars 50 are particularly useful for the displacement of pressure, which allows the device to function better. In other words, on a typical rake system, the rake wheels are attached to a straight bar. The rake wheels on the outer most part of the bars do not have much pressure, as they come into contact with very little hay. However, as the hay rolls from rake wheel to rake wheel, the rake wheels proximal to the swather or tractor are under a very large pressure. This pressure can cause the rake wheels to buckle under pressure, or can cause the straight bars to begin to bend outwardly more than desired, due to the excess pressure. This problem is significantly overcome using a parabolic curve, which can create a more even distribution of hay earlier in the raking process, creating less pressure on the raking frame. This reduces the risk of breakage, reduces wear and tear on the rake wheels, and creates a more efficient system. While a parabolic curve is specifically used as an example, a similar, non-linear curve may be used. Likewise, while the curve illustrated in the Figs. is created using one solid bar of manufacture, it will be appreciated that the combination of individual bars or their equivalents for the purpose of creating a non-linear configuration is contemplated herein. It will be appreciated that while hay is specifically described herein, other agricultural products that require raking are specifically contemplated herein.

Arched reinforcement members 52 are coupled to, and support, the parabolic curved tool bar member 50 through a plurality of bracing members 54. Bracing members 54 may be positioned at various locations and angles for structural support. In this configuration, the rake arm assemblies 14, 16 remain lighter in weight, requiring less horsepower for the swather or tractor to maneuver, while also allowing for the entire rake assembly 10 to be raised above the ground without burdening the swather or tractor. In other words, if the rake assembly 10 is too heavy, it may cause the swather to tip forward when attempting to raise the rake assembly 10 off of the ground for transportation. The present invention solves this by creating a lightweight, yet sufficiently sturdy bar structure (parabolic curved tool bar 50 with arched reinforcement members 52) for the rake assembly 10. The rake wheels 60 are connected to a free turning hub and bearing assembly 59 which is attached to the wheel holding arm member 58. The positioning of the wheel holding arm member 58 is held by the wheel arm torsion pivot 56. The wheel arm torsion pivot 56 is a simple mechanism that allows for easier floatation (less operating ground pressure) of raking wheels to travel over uneven surfaces of field with less damage to the wheel, soil, and crop. The wheel arm torsion pivot 56 is beneficial to replace extensive chains, brackets, springs, etc. and to prevent massive upward jolting of wheels when hitting large bumps, ruts, or holes in fields.

Located on the front portion of rake assembly 10 is an angle-adjusting connecting point 48, which may also have a ball joint 88 thereon, and which is supported by structural support members 38. Connecting cables 84 connect to ball joint 88 and to a pulley assembly guide head 86.

The rake arm assemblies 14, 16 are activated and widened by lowering the entire rake assembly 10 to the ground. This is accomplished due to the non-moving connecting point 71 to the swather (standard for a the three-point hitch) while the center pivoting pin 69 of Z-bar 70 is traveling downward, which changes the position of the opposite end of Z-bar 70 via end cable connecting point 82 downward, which releases tension on cables 84 that travels through the pulley assembly guide head 86 to the rake arm assemblies 14, 16, connecting to angle adjusting connecting point 48 by the means of a ball joint 88. The outward motion of rake arm assemblies 14, 16 is assisted by the tension applied to the rear of lateral holding arms 32 by the means of springs 64 attaching to spring connecting structural member 66 and spring connecting bracket 62 to the main frame horizontal member 24.

The Z-bar 70 further comprises reinforcing member 78, truss support member 76, upper adjoining plates 74, and lower adjoining plates 72. Connected to the Z-bar 70 is the Z-bar pivoting plates 68 which pivot off from the center pivoting pin 69, which is held by connecting plates 80 to the main frame horizontal member 24.

The pulley assembly guide head 86 is held in position by the cable guide holding member 90 which is connected to the main frame horizontal member 24 and is supported by the cable guide support members 92, which are also attached to main frame vertical members 22.

Figure 3:
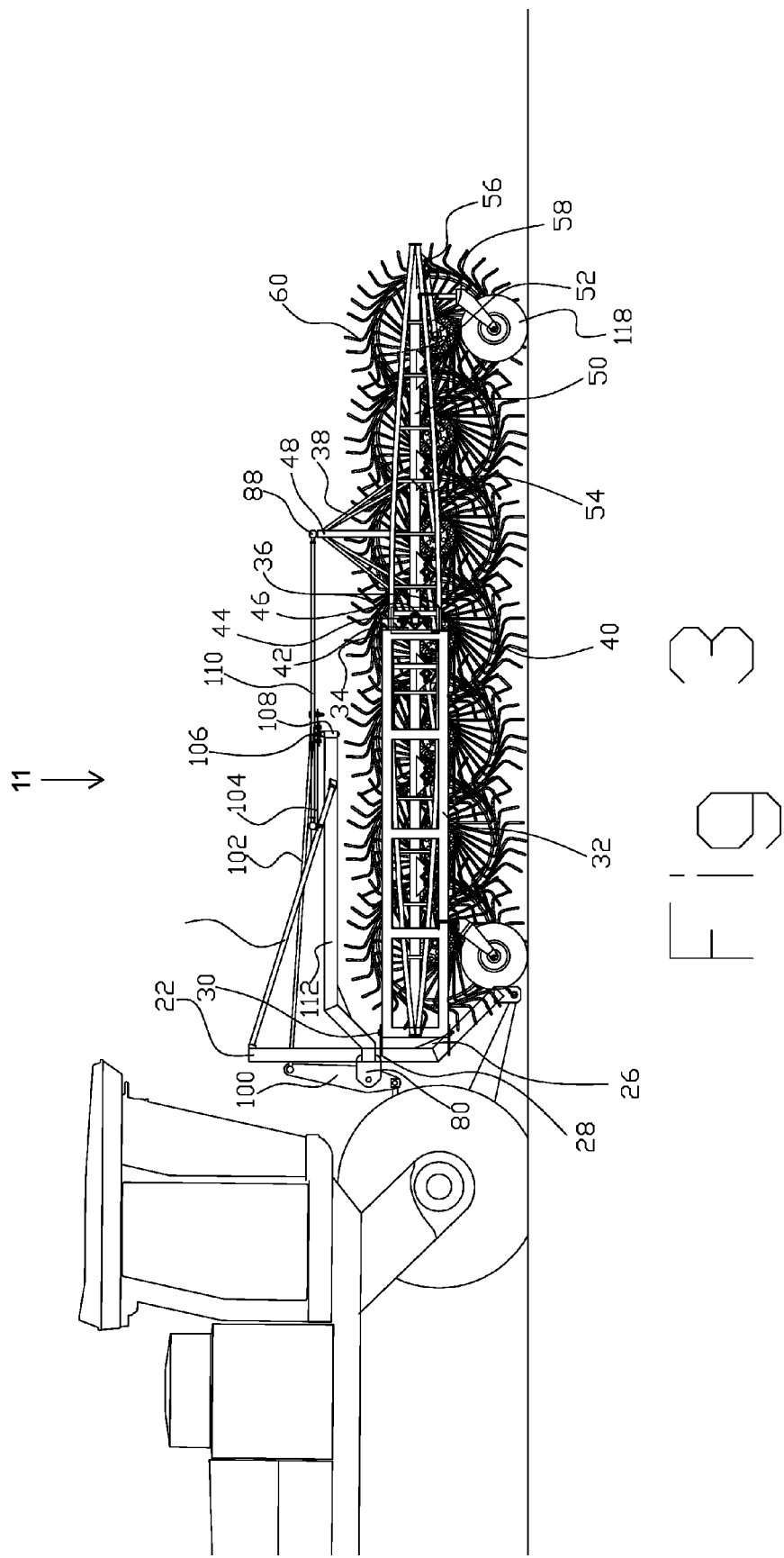
FIG. 3 is a side view of a self-propelled swather with an adjustable forward-rake assembly attached by hydraulic-activated Z-bars with tie rods.
Figure 4:
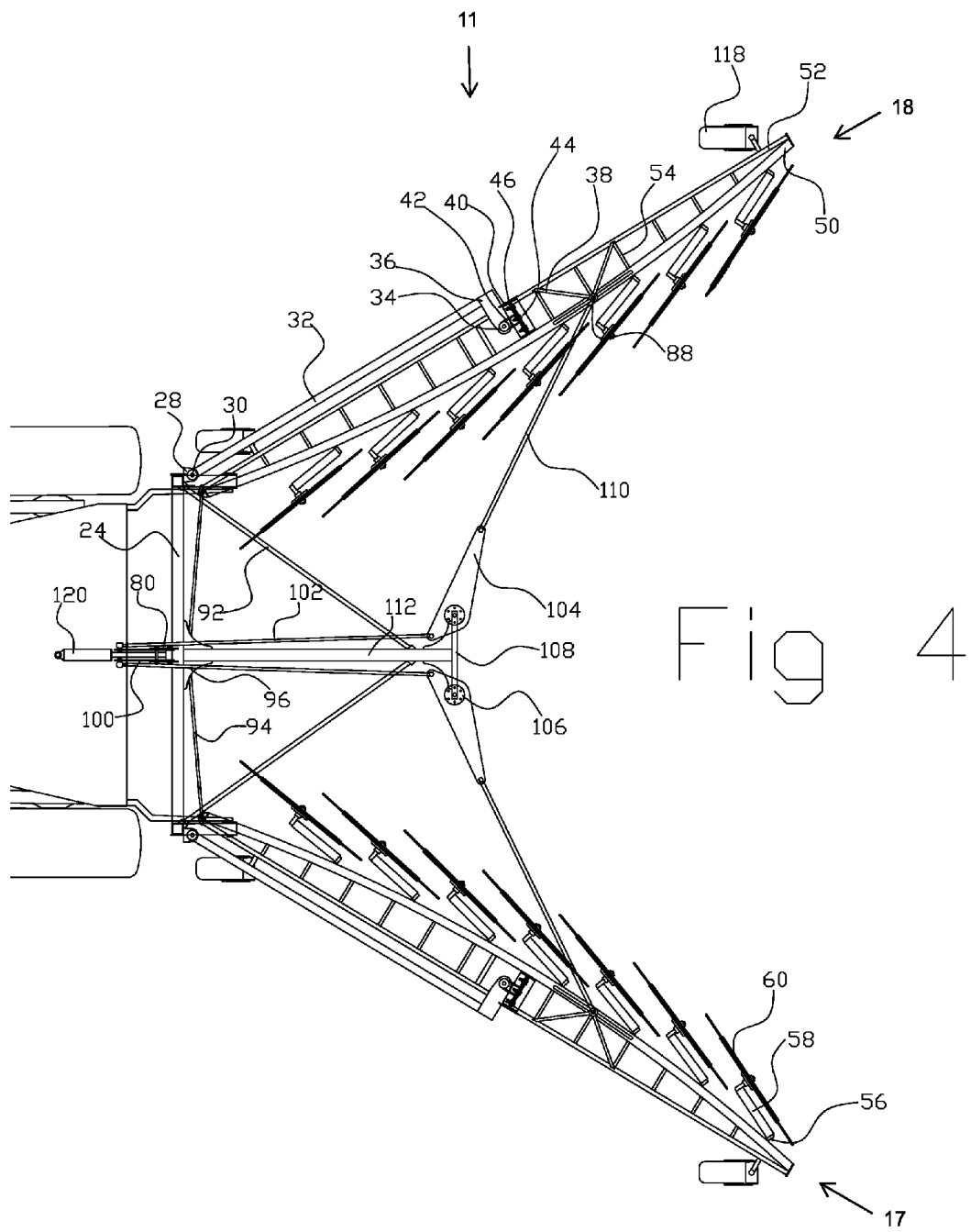
FIG. 4 is a top view of a self-propelled swather with an adjustable forward-rake assembly attached by hydraulic-activated Z-bars with tie rods

In one embodiment, as shown in FIGS. 3-4, a rake assembly 11 may comprise a first Z-bar 100, which is coupled to the swather's third point hitch connection at one end and to mid-bar 102 on a second end, and at least one second Z-bar 104. Second Z-bar 104 is coupled at one end to mid-bar 102 at one end and to tie rods 110 to provide a means to open, close, and set operating positions at the other end. Swivel gauge wheels 118 may be positioned toward the ends of the rake arm assemblies 17, 18 and are utilized to set working height. FIG. 4 illustrates that when the rake arm assemblies 17, 18 are lowered, they extend outwardly due to the release of tension on the tie rods 110. Swivel gauge wheels 118 may also comprise a torsion suspension so as to allow controlled "rocking" of the rake assembly 11.

Figure 5:
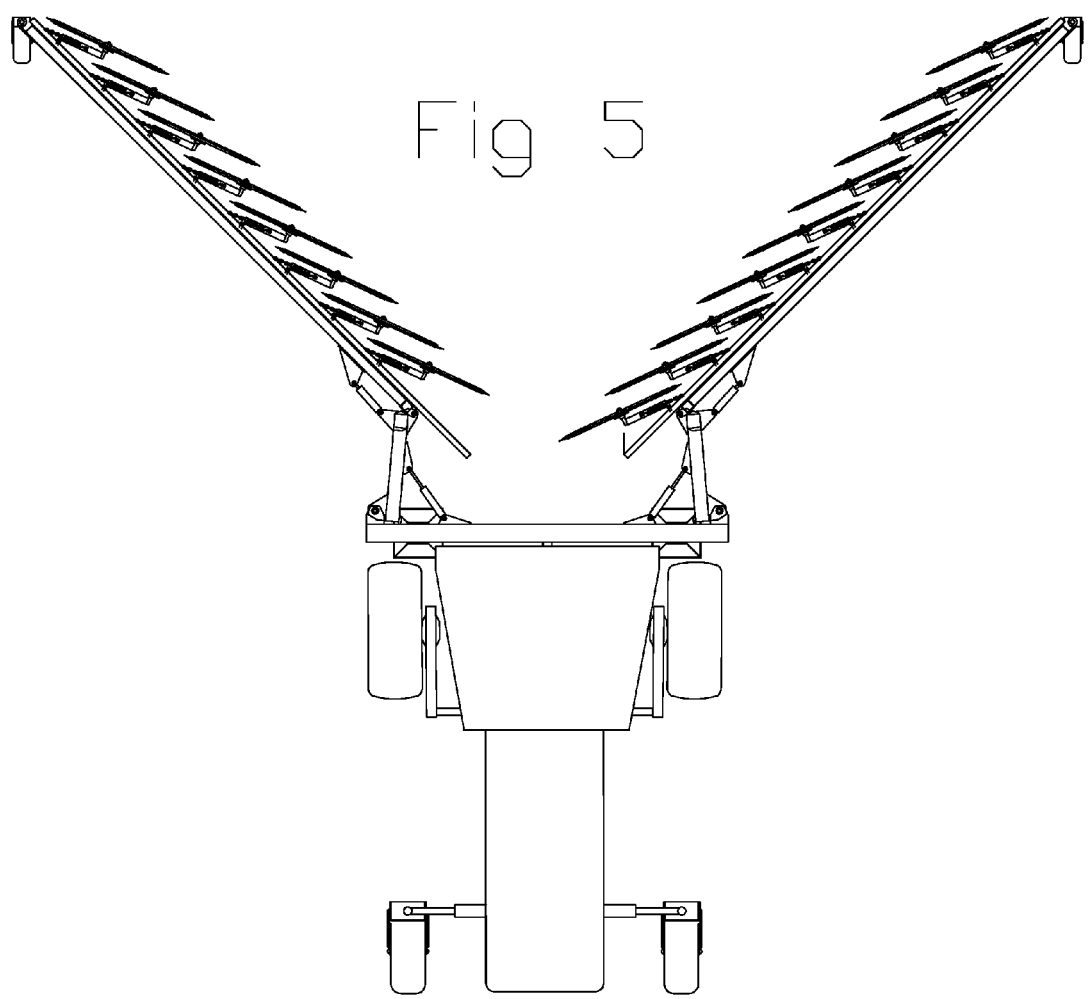
FIG. 5 is a top view of a self-propelled swather with forward-rake assembly having a double-jointed pivoting system adjusted by a primary pivot as well as a secondary pivot.
Figure 8:
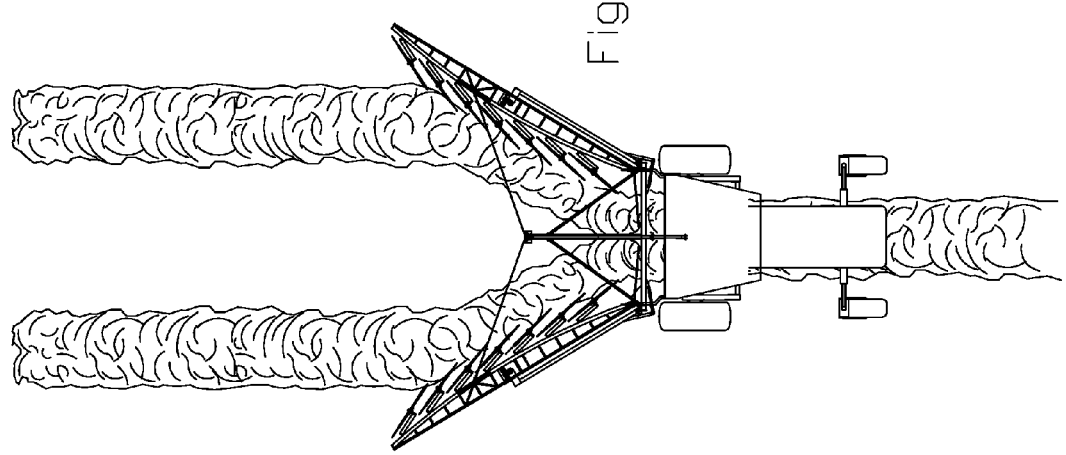
FIG. 8 is a top view of self-propelled swather with a forward-rake assembly configured to allow for raking two rows closer in proximity.

FIG. 5 is a top view of a self-propelled swather with a forward-rake attachment assembly having a primary pivot (hydraulic ram attached to the swather) as well as a secondary pivot (hydraulic arm on the side of the rake arm). The hydraulics are controlled by the standard hydraulic control system utilized in swathers and tractors well known in the art. Having two pivot points allows the operator to control the width and angle of the rake arms. As shown in FIG. 8, this allows the operator to maintain two windrows when raking the hay, or to combine them into one by bringing the arms closer together.

Figure 6:
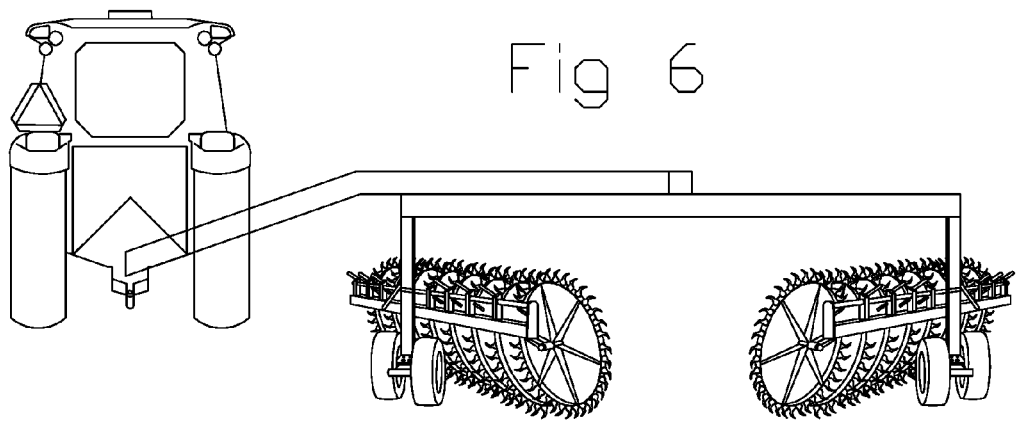
FIG. 6 is a back view of a hydro-swing pull swather with rake assembly attached.
Figure 7:
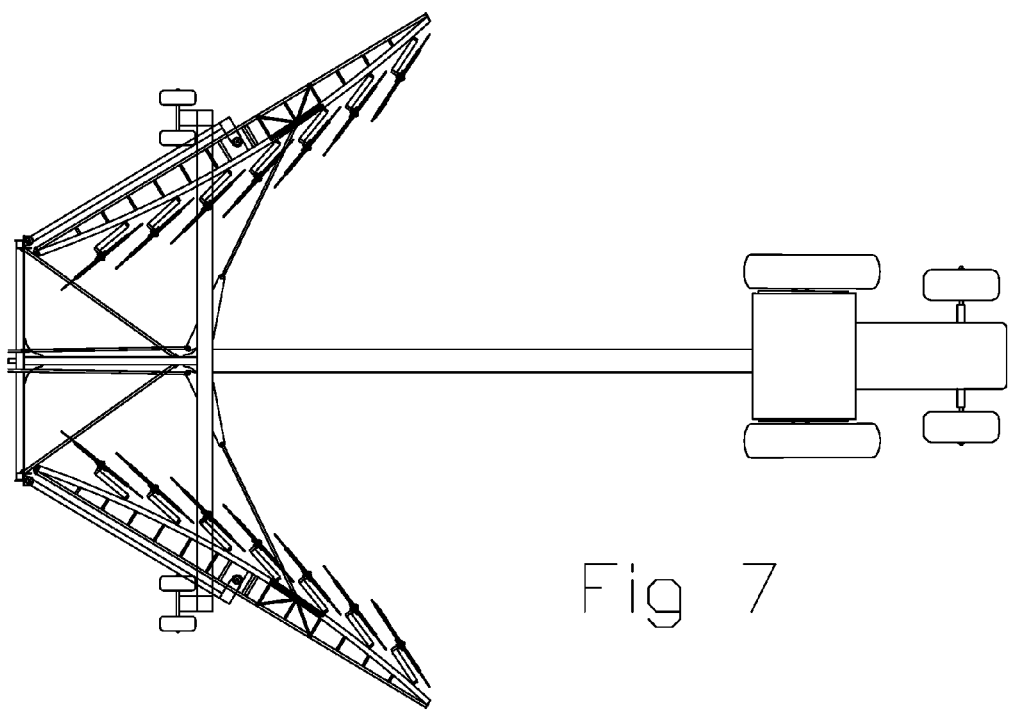
FIG. 7 is a top view of a hydro-swing pull swather with rake assembly attached.

FIG. 6 is a back view of a hydro-swing pull swather with a rake assembly attached. While hydro swings have been utilized for cutting assemblies, the prior art has failed at using them in connection with raking assemblies. As best seen in FIG. 7, the rake assembly may comprise a parabolic curved tool bar on each rake arm assembly so as to achieve the benefits mentioned earlier herein.

FIG. 8 is a top view of self-propelled swather with a forward-rake assembly configured to allow for raking two rows closer in proximity, as discussed earlier. In other words, each rake arm assembly is extended outwardly such that when the two rows of hay are raked, two new rows of hay are created.

Figure 9:
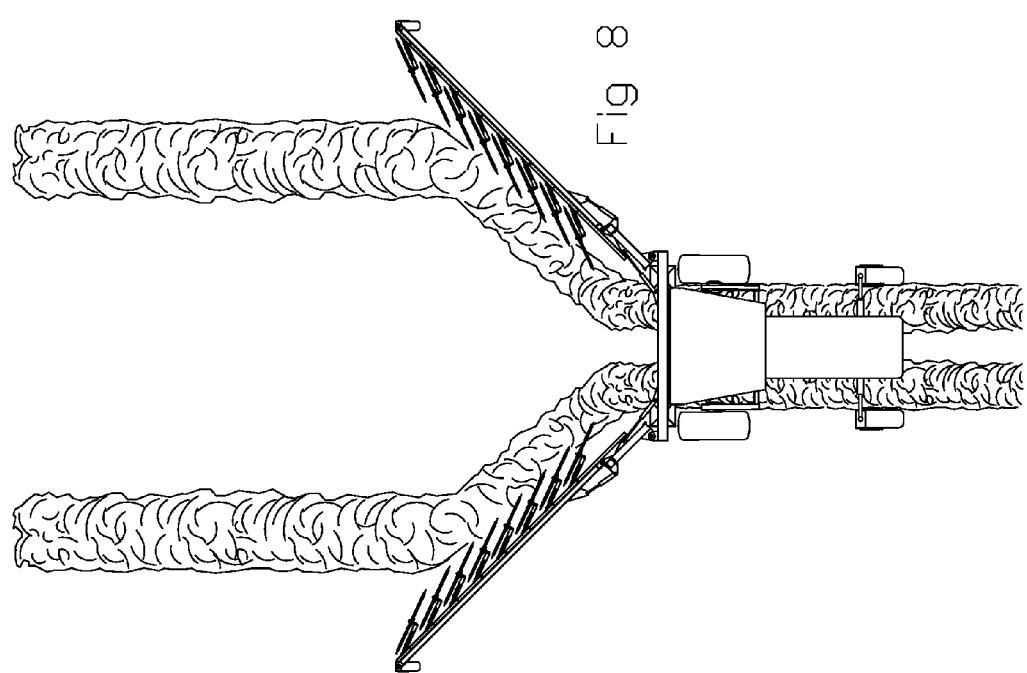
FIG. 9 is a top view of self-propelled swather with a forward-rake assembly configured to allow for raking two rows into one row.

FIG. 9 is a top view of self-propelled swather with a forward-rake assembly configured to allow for raking two rows into one row. In other words, the rake arm assemblies are sufficiently close that when the rake passes over two rows of hay, only one row of hay results. As shown, a Z-bar with accompanying cable assemblies (as described in other embodiments herein) allow the operator to control the distance between the two rake arm assemblies as well as provide additional support to each rake arm assembly. In other words, the Z-bar and accompanying assemblies help to prevent the forward pressure on the arm assemblies from forcing the arm assemblies outwardly. The parabolic curved tool bar also adds significant structural strength, allowing the swather to push the rake assembly forward without fear of damage to the rake assembly.

Figure 10:
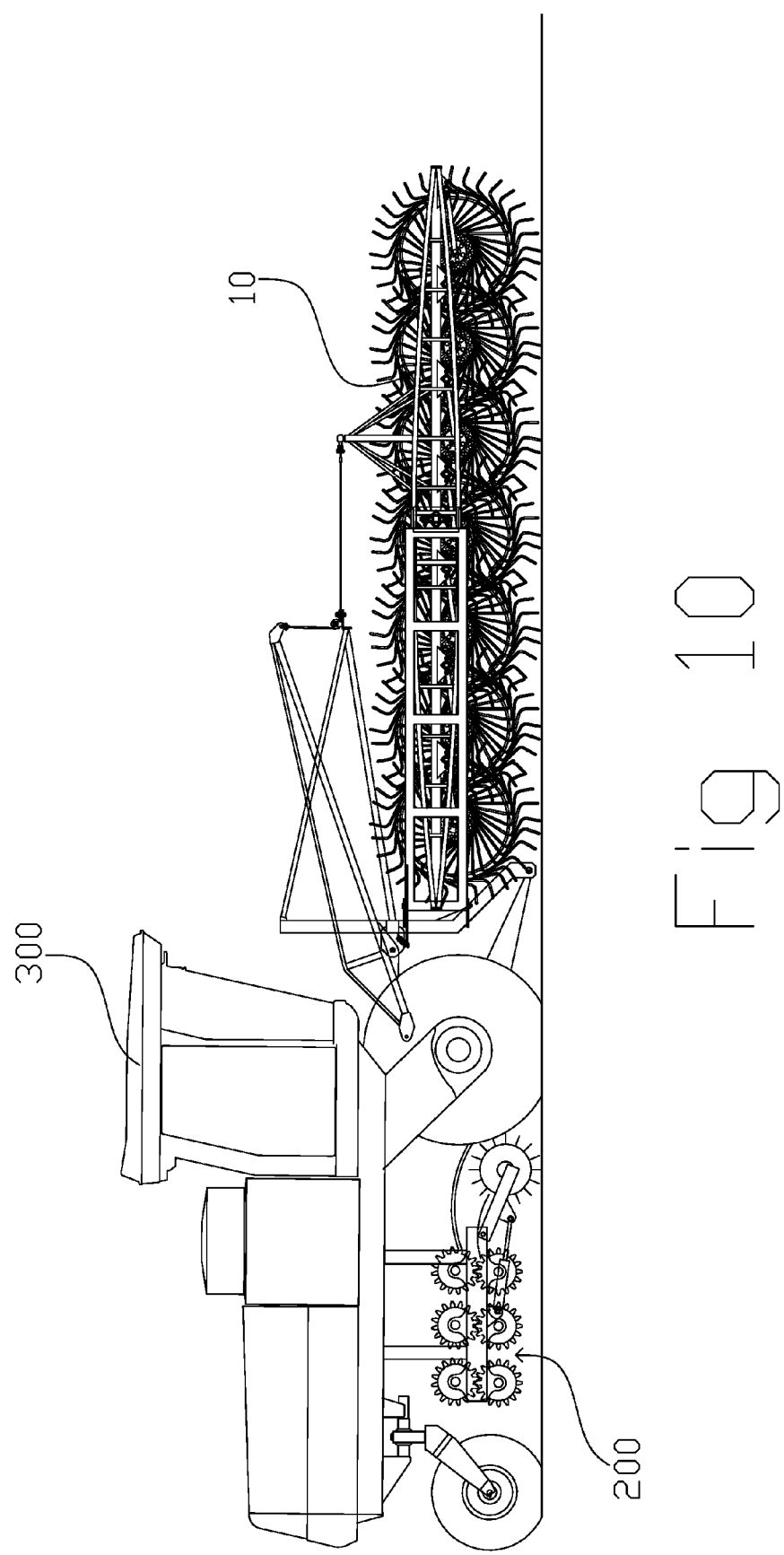
FIG. 10 is a side view of self-propelled swather with a forward-rake assembly combined with a conditioner/processor apparatus following the forward-rake.

FIG. 10 is a side view of self-propelled swather with a forward-rake assembly 10 of one embodiment combined with an agricultural conditioner/processor apparatus 200 following the forward-rake assembly 10. In other words, in one method of use, an operator would rake the hay using rake assembly 10, which would then pass the hay to conditioner apparatus 200, where it can be beneficially processed (e.g., bent, broken, flattened, etc.). In one embodiment, the conditioner apparatus 200 may be coupled to the underside of the swather 300. In another embodiment, as shown in FIG. 11, it may be attached to the rake assembly.

FIG. 11 is a side view of a tractor 400 pulling a hydro-swing frame 500 (previously used for pull cutting apparatuses only) with a pull-type rake assembly 13 combined with a conditioner/processor apparatus attachment 201 following the pull-type rake assembly. In other words, the gooseneck 500 remains attached to the tractor 400 while the working distal end may be attached to different assemblies as required. For example, a user may use a cutting assembly first, then remove the cutting assembly from the gooseneck 500 and attach the raking assembly 13. In this way, an operator is able to achieve the same results with less cost by reducing the need to purchase additional equipment, such as a swather.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention as defined in the appended claims. Additionally, it is not intended that the scope of patent protection afforded the present invention be defined by reading into any claim a limitation found herein that does not explicitly appear in the claim itself.

We claim:

1. A system for agricultural raking comprising:
    a rake assembly removably attachable to a swather, wherein the rake assembly comprises two arm assemblies having a plurality of rake wheels couples thereto wherein the rake assembly includes a base frame removably attachable to the swather by one or more connection points, said base frame has two rake arm assemblies extending horizontally therefrom, and each said rake assembly has a lateral holding arm connected to said base frame using a primary pivot connector, which said lateral arms are pivotally coupled to two arched reinforcement members via a pivoting torsion assembly, with said pivoting torsion assembly being further coupled to a parabolic curved tool bar; a plurality of bracing members are interposed between said parabolic curved tool bar and said two arched reinforcement members; said plurality of rake wheels are pivotally coupled to said parabolic curved tool bar; and a Z-bar couples said two rake arm assemblies together and is configured to control the height of said arm rake assemblies.

2. The system for agricultural raking of claim 1, wherein one or more cables are used in conjunction with the Z-bar to control the relative height and distance of the arm rake assemblies.

3. The system for agricultural raking of claim 1, wherein one or more tie-rods are used in conjunction with the Z-bar to control the relative height and distance of the arm rake assemblies.

4. The system for agricultural raking of claim 1, wherein the rake assembly comprises swivel gauge wheels having a torsion suspension system.

5. The system for agricultural raking of claim 1, wherein the rake assembly includes two rake arm assemblies that are individually attachable to the front of a swather, with each said rake arm assembly having two hydraulically driven pivot points.

6. The system for agricultural raking of claim 5, wherein each rake arm assembly further comprises a parabolic curved tool bar.

7. A rake arm assembly, comprising:
    a plurality of rake wheels configured non-linearly for a displacement of raking pressure;
    said rake wheels are coupled to a parabolic curved tool bar; and wherein one or more arched reinforcement members are coupled to said parabolic curved tool bar through a plurality of bracing members.

* * * * *